July 2, 1957   C. L. BEATTIE ET AL   2,797,865
ELECTRONIC GENERATOR OF A FUNCTION OF TWO VARIABLES
Filed Sept. 11, 1953   3 Sheets-Sheet 1

Inventors:
Clare L. Beattie,
Herman D. Parks,
by Charles W. Helzer
Their Attorney.

Fig. A.

July 2, 1957 C. L. BEATTIE ET AL 2,797,865
ELECTRONIC GENERATOR OF A FUNCTION OF TWO VARIABLES
Filed Sept. 11, 1953 3 Sheets-Sheet 3

Inventors:
Clare L Beattie,
Herman D. Parks,
by Charles W. Helzer
Their Attorney.

2,797,865
Patented July 2, 1957

2,797,865

ELECTRONIC GENERATOR OF A FUNCTION OF TWO VARIABLES

Clare L. Beattie, Ballston Lake, N. Y., and Herman D. Parks, Norwalk, Conn., assignors to General Electric Company, a corporation of New York Application September 11, 1953, Serial No. 379,685

12 Claims. (Cl. 235—61)

This invention pertains to analog computers, and more particularly to a novel apparatus for generating a function of two variables, wherein the input variables and the value of the function are represented by analogs in the form of electric potentials.

In the field of mathematics, functions of two variables occur fairly frequently, and modern high speed computation processes demand that the value of the function be obtained in a minimum amount of time. Therefore, solving the problem by the customary method of manual computation is unfeasible. Accordingly, it is an object of the present invention to provide an apparatus for generating a function of two variables in which the values of the function may be obtained practically instantaneously and with a high degree of accuracy.

Another object of the invention is to provide an apparatus for generating such a function in which the input variables and the output values of the function are represented by analogs of the numerical quantities, whereby the input variables may be derived from prior analog computing devices, and the output can serve as the input to a succeeding computer.

Another object of the invention is to provide such an apparatus which utilizes conventional well-known electronic circuits and easily obtainable components.

The apparatus of the present invention, by means of which continuously varying values of a function which depends on two variables may be obtained, is based on the principle of interpolation. In a function of two variables, which is assumed to be continuous in the mathematical sense, all of the possible values of the function may be said to lie on a surface. In the apparatus of this invention, a number of values of the function are obtained by conventional means, such as hand computation, which are so distributed on the surface defined by the function as to constitute corners of a plurality of elemental rectangular areas on the surface. The desired value of the function, within the elemental area in which it lies, is then obtained by linear interpolation between the boundaries of the elemental area, and electronic circuits are employed to perform the interpolation accurately and quickly.

In the apparatus of the present invention, especial advantage is derived from the fact that the points on the surface defined by the function, whose values are known, need not be linearly distributed; that is, the elemental rectangular areas lying on the surface need not all be of the same size or shape. A number of elemental areas of small size may be employed in that area of the function in which it is changing rapidly, and larger areas employed in "straight line" portions of the function. Thus, high overall accuracy may be attained. High speed relays or electronic switches are employed in the device to switch the interpolating circuits from one elemental area to another, and the output varies practically instantaneously with the input variables. In addition, transients are prevented from occurring by means of the novel switching method employed.

Further objects and advantages of the invention will become apparent from the following description, taken in conjunction with the accompanying drawings, in which

Fig. 5 is a diagram of the values of the X and Y input variables for which known values of the function are set up in the apparatus illustrated in Figs. 4 and 4a;

Figure 1:
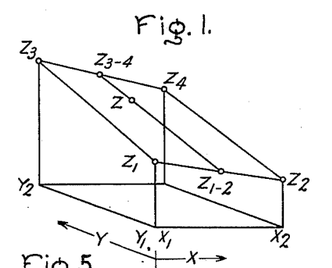
Fig. 1 is a diagram of the basic mathematical concept involved in the invention.

Fig. 1 illustrates the mathematical concept of linear interpolation within a surface area $Z_1Z_2Z_3Z_4$ to find the value of Z of a function of variables X and Y. All of the possible values of Z lie on the surface, and the corner points are defined by known values of Z, that is, $Z_1$ is the value of the function when X and Y are both zero, $Z_2$ is its value when X has its maximum value and Y is zero, $Z_3$ is its value when Y has its maximum value and X is zero, and $Z_4$ is its value when X and Y both have their maximum values. First, a linear interpolation is made between the points $Z_1$ and $Z_2$, which yields (1) $$Z_{1-2} = Z_1 + \frac{X}{X_2 - X_1}(Z_2 - Z_1)$$

Next, a similar interpolation is made between the points $Z_3$ and $Z_4$, to obtain (2) $$Z_{3-4} = Z_3 + \frac{X}{X_2 - X_1}(Z_4 - Z_3)$$

A third interpolation, which determines the value of Z, is made between the points $Z_{1-2}$ and $Z_{3-4}$, and this final interpolation yields (3) $$Z = Z_{1-2} + \frac{Y}{Y_2 - Y_1}(Z_{3-4} - Z_{1-2})$$

By substituting Eqs. 1 and 2 into Eq. 3, the value of Z may be obtained in terms of the four known corner values $Z_1$, $Z_2$, $Z_3$ and $Z_4$, and the variables X and Y. This substitution yields (4) $$Z = Z_1\left[1 - \frac{X}{X_2-X_1} - \frac{Y}{Y_2-Y_1} + \frac{XY}{(X_2-X_1)(Y_2-Y_1)}\right] + Z_2\left[\frac{X}{X_2-X_1} - \frac{XY}{(X_2-X_1)(Y_2-Y_1)}\right] + Z_3\left[\frac{Y}{Y_2-Y_1} - \frac{XY}{(X_2-X_1)(Y_2-Y_1)}\right] + Z_4\left[\frac{XY}{(X_2-X_1)(Y_2-Y_1)}\right]$$

Eq. 4, in a somewhat modified form, is the basis for the generator of the present invention.

In order to perform the linear interpolation as described above, the area of the surface within which the interpolation is made must be rectangular, although it need not be square. It is apparent that if the surface area is a plane, the value of Z obtained by such interpolation will be exact, but as the actual surface area departs from planeness, the value of Z so obtained becomes less accurate. Nevertheless, if the surface area is reasonably small, the error is well within the limits of tolerance required in the usual computation processes.

Figure 2:
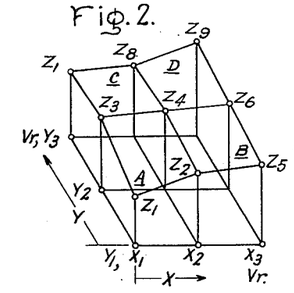
Fig. 2 is a diagram illustrating the mathematical concept of Fig. 1, as applied to the present invention.

It is apparent that the concept thus far developed must be carried still farther in order to make it suitable for use in a computer. For example, the surface which represents the function must be divided into a number of areas, each similar to that shown in Fig. 1. Such a concept is shown in Fig. 2, wherein the surface of the function is divided into rectangular areas A, B, C and D, defined by values $Z_1, Z_2 \ldots Z_9$ of the function determined by equally spaced values of the X and Y variables, designated $X_1, X_2, X_3, Y_1, Y_2$ and $Y_3$. In a computer, it is desirable to represent the input and output quantities by analogs which permit the device to be linked to preceding and succeeding equipments. In the present instance, the input variables are represented by electric potentials, and the various operations performed on these potentials to obtain the values of the function in terms of an electric potential. It is necessary that in an electronic computer the various potentials involved must be scaled; that is, there must be a reference voltage, and the various other voltages must be stated in terms of the reference voltage. In this instance, the reference voltage $V_r$ is taken to be the maximum value which either X or Y may attain. Thus, the various values of the function become (5) $$z = \frac{ZV_r}{Z_{max.}}, z_1 = \frac{Z_1 V_r}{Z_{max.}}, z_2 = \frac{Z_2 V_r}{Z_{max.}} \ldots z_9 = \frac{Z_9 V_r}{Z_{max.}}$$

Similarly, the scaled values of X and Y become (6) $$x = \frac{XV_r}{X_{max.}}, y = \frac{YV_r}{Y_{max.}}$$

However, as was previously stated, $V_r$ is defined as the maximum value which either X or Y may attain, and, therefore $$\frac{V_r}{X_{max.}} \text{ and } \frac{V_r}{Y_{max.}}$$

both equal unity, and the various values of X and Y need not be scaled, in the present case.

In terms of the scaled values, Eqs. 1, 2, and 3 may be rewritten as follows:

(7) $$z_{1-2} = z_1 + \frac{X}{X_2 - X_1}(z_2 - z_1)$$

(8) $$z_{3-4} = z_3 + \frac{X}{X_2 - X_1}(z_4 - z_3)$$

(9) $$z = z_{1-2} + \frac{Y}{Y_2 - Y_1}(z_{3-4} - z_{1-2})$$

When Eq. 5 is substituted into Eqs. 7 and 8 and terms collected, they become (10) $$z_{1-2} = \frac{Z_1}{Z_{max.}}\left[V_r - \frac{XV_r}{X_2 - X_1}\right] + \frac{Z_2}{Z_{max.}}\left[\frac{XV_r}{X_2 - X_1}\right]$$

(11) $$z_{3-4} = \frac{Z_3}{Z_{max.}}\left[V_r - \frac{XV_r}{X_2 - X_1}\right] + \frac{Z_4}{Z_{max.}}\left[\frac{XV_r}{X_2 - X_1}\right]$$

When Eqs. 10 and 11 are substituted into Eq. 9, the following equation is obtained:

(12) $$z = \frac{Z_1}{Z_{max.}}\left[V_r - \frac{XV_r}{X_2 - X_1} - \frac{YV_r}{Y_2 - Y_1} + \frac{XYV_r}{(Y_2 - Y_1)(X_2 - X_1)}\right] + \frac{Z_2}{Z_{max.}}\left[\frac{XV_r}{X_2 - X_1} - \frac{XYV_r}{(X_2 - X_1)(Y_2 - Y_1)}\right] + \frac{Z_3}{Z_{max.}}\left[\frac{YV_r}{Y_2 - Y_1} - \frac{XYV_r}{(X_2 - X_1)(Y_2 - Y_1)}\right] + \frac{Z_4}{Z_{max.}}\left[\frac{XYV_r}{(X_2 - X_1)(Y_2 - Y_1)}\right]$$

The terms $Y_2 - Y_1$ and $X_2 - X_1$ are constant for each area, and, therefore, the ratio of each of these terms to $V_r$ may be replaced by a term S, known as the "span." By definition, these terms are (13) $$S_{1-2} = \frac{X_2 - X_1}{V_r}; S_{1-3} = \frac{Y_2 - Y_1}{V_r}$$

It is also seen that the ratios $$\frac{Z_1}{Z_{max.}}, \frac{Z_2}{Z_{max.}}, \frac{Z_3}{Z_{max.}}$$

and $$\frac{Z_4}{Z_{max.}}$$

by which the polynomial terms of Eq. 12 are multiplied, are constant. Therefore, these ratios may be replaced by resistance ratios, as follows:

(14) $$\frac{R_1}{R} = \frac{Z_1}{Z_{max.}}; \frac{R_2}{R} = \frac{Z_2}{Z_{max.}}; \frac{R_3}{R} = \frac{Z_3}{Z_{max.}}; \frac{R_4}{R} = \frac{Z_4}{Z_{max.}}$$

In its present form, Eq. 12 deals with the action of a function generator only in the elemental area A at the origin of the plot. To make it applicable to all areas, the X and Y input variables must be measured with respect to the values of X and Y corresponding to the boundaries of the particular area within which the value of the function Z lies. Thus, if Eqs. 13 and 14 are substituted into Eq. 12, and X and Y are converted into $\Delta X$ and $\Delta Y$, the equation becomes (15) $$z = \frac{R_1}{R}\left[V_r - \frac{\Delta X}{S_{1-2}} - \frac{\Delta Y}{S_{1-3}} + \frac{\Delta X \Delta Y}{S_{1-2} S_{1-3} V_r}\right] + \frac{R_2}{R}\left[\frac{\Delta X}{S_{1-2}} - \frac{\Delta X \Delta Y}{S_{1-2} S_{1-3} V_r}\right] + \frac{R_3}{R}\left[\frac{\Delta Y}{S_{1-3}} - \frac{\Delta X \Delta Y}{S_{1-2} S_{1-3} V_r}\right] + \frac{R_4}{R}\left[\frac{\Delta X \Delta Y}{S_{1-2} S_{1-3} V_r}\right]$$

Eq. 15 sets forth the actual mathematical steps which are performed by the device of the present invention, as will later be described in detail.

It is apparent from inspection of Fig. 2 that, when the values of X and Y increase to the point where the value of the function Z passes from one elemental area to another, a number of switching operations must be performed. For example, let it be assumed that the values of X and Y are such that Z lies within area A, defined by known corner values $Z_1, Z_2, Z_3$ and $Z_4$. In this case, the line $Y_1 - Y_2$ serves as the base line from which $\Delta X$ is measured, and the line $X_1 - X_2$ serves as the base line from which $\Delta Y$ is measured. When X and Y increase to the point where Z passes out of area A into area B, all four corner values must be replaced by others; that is, $Z_2$ will be replaced by $Z_5$, $Z_4$ by $Z_6$, $Z_1$ by $Z_2$, and $Z_3$ by $Z_4$. Furthermore, at the time the switching operation occurs, the values of $\Delta X$ and $\Delta Y$ are at a maximum. Immediately thereafter, the values of $\Delta X$ and $\Delta Y$ drop to zero and again start to increase as X and Y increase. Such involved switching, at a time when $\Delta X$ and $\Delta Y$ are at their maximum values, causes many transients to occur in the output circuit, which, of course, affect the accuracy of the function generated by the device.

Figure 3:
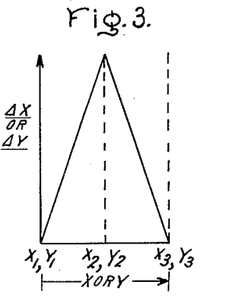
Fig. 3 is a diagram useful in understanding the principle of switching employed in the invention.

The objectionable transients associated with the switching action are eliminated in the present invention by applying a principle known as "zero switching." Referring to Fig. 2, it is apparent that, if in going from area A to area B, $Z_2$ and $Z_4$ may be left undisturbed, and $Z_1$ and $Z_3$ merely replaced by $Z_5$ and $Z_6$, the switching operation will be considerably simplified. However, in order to do this validly, it is necessary that $\Delta X$ increase as $X$ increases from $X_1$ to $X_2$, and decrease as $X$ continues to increase from $X_2$ to $X_3$, because the point from which $\Delta X$ is measured changes from $X_1$ to $X_3$ when $Z$ passes from area A to area B. Similarly, $\Delta Y$ must increase as $Y$ increases from $Y_1$ to $Y_2$ and decrease as $Y$ increases from $Y_2$ to $Y_3$. Thus the values of $\Delta X$ and $\Delta Y$ corresponding to various values of $X$ and $Y$ are as shown in Fig. 3. Applying this switching principle to Eq. 15, it is seen that as $Z$ passes from area A into area B, resistances $R_1$ and $R_3$ representing the values of $Z_1$ and $Z_3$ must be replaced by resistances $R_5$ and $R_6$ respectively, representing $Z_5$ and $Z_6$. As shown by Fig. 3, at the time the boundary between areas A and B is passed $\Delta X$ is at its maximum value, which, by definition, is equal to $X_2-X_1$. Thus $\Delta X$ equals $S_{1-2}V_r$, at this time, and when this value of $\Delta X$ is substituted into Eq. 15, it is found that the polynomials which are multiplied by $R_1$ and $R_3$ are zero. Thus, the switching associated with resistances $R_1$ and $R_3$ is accomplished at zero potential, and transients are prevented from occurring. Similarly, when the value of $Z$ is such that the boundary between areas A and C is crossed, which requires replacing $R_1$ and $R_2$ with $R_7$ and $R_8$, $\Delta Y$ is at its maximum value and the polynomials associated with $R_1$ and $R_2$ are equal to zero. It can also be shown in a similar fashion that where there are a greater number of areas along the $X$ and $Y$ axes than shown in Fig. 2, and $\Delta X$ and $\Delta Y$ reverse their slopes at the zero points, the polynomials associated with the resistances which are switched into and out of the circuit at this point are equal to zero. In practice, it has been found that even though a finite time is required for the switching operation, the transients created by the switching are small and unimportant when the "zero switching" principle is employed.

Figure 4:
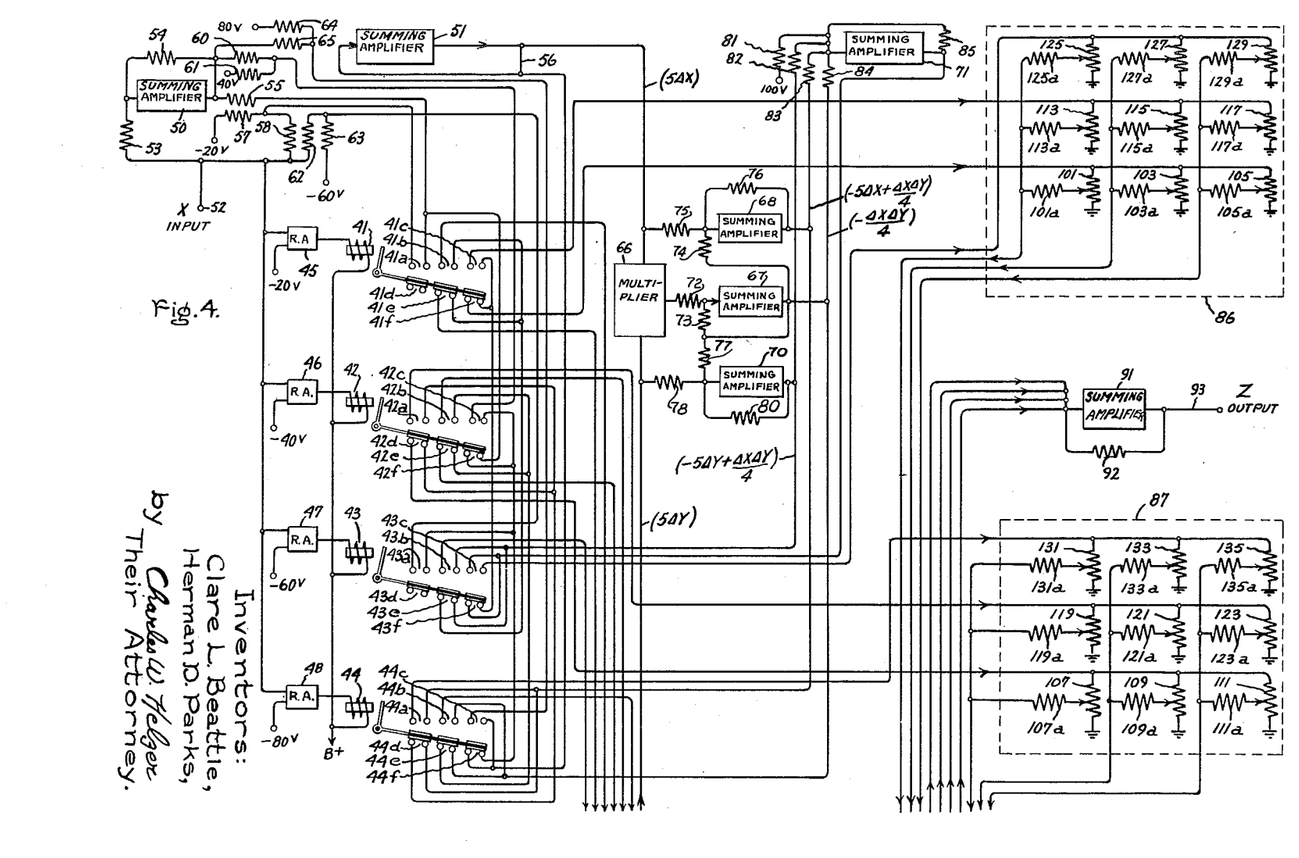
Fig. 4 and Fig. 4a are a block diagram of the apparatus of the invention, divided into two parts for the sake of clarity.

For purposes of explanation, there is illustrated in Fig. 4 and will be described in detail the construction and operation of a generator of a function $Z$ of variables $X$ and $Y$, wherein the surface of the function is divided into twenty-five elemental areas defined by thirty-six corner values of the function, which are determined by equally spaced values of $X$ and $Y$ corresponding to points 1 through 36, shown in Fig. 5. It is apparent that each of the elemental areas is square, and that there are an equal number of areas along the $X$ and $Y$ coordinates. It is to be understood, however, that the elemental areas need not be square or of the same size, nor need there be equal numbers of them along the $X$ and $Y$ axes. Eq. 15 and the apparatus whose description is to follow are not limited to such an arrangement. Eq. 15 is applicable to any arrangement of rectangular elemental areas, with due regard to the various definitions previously set forth, and the apparatus shown in Fig. 4 may easily be modified, as will be specifically pointed out, to operate efficiently and accurately with various sizes and shapes of rectangular elemental areas.

For purposes of description, the value of $V_r$ is arbitrarily chosen as 100 volts, and, because the $X$ and $Y$ values corresponding to corner points of the function are equally spaced, all of the spans $S$ are equal. Therefore, the maximum values of $\Delta X$ and $\Delta Y$ are 20 volts, and each span, where there are five equal spans on each axis, is equal to 0.2. Upon substituting these values into Eq. 15, it is found for the specific device being described that (16)
$$z=\frac{R_1}{R}\left[100-5\Delta X-5\Delta Y+\frac{\Delta X \Delta Y}{4}\right]+\frac{R_2}{R_1}\left[5\Delta X-\frac{\Delta X \Delta Y}{4}\right]+\frac{R_3}{R}\left[5\Delta Y-\frac{\Delta X \Delta Y}{4}\right]+\frac{R_4}{R}\left[\frac{\Delta X \Delta Y}{4}\right]$$

Control of the apparatus resides in a plurality of relays in the $X$ and $Y$ input circuits, which operate to perform various switching operations as the values of $Z$ pass from one elemental area to another. In the embodiment of the invention illustrated, there are four relays 41, 42, 43, and 44 associated with the $X$ input circuit, and four similar relays 141, 142, 143, and 144 associated with the $Y$ input circuit. Each of the relays is of a high speed type, and has six pairs of contacts, three of which are open and three of which are closed at any one time. It is apparent, of course, that each relay might be replaced by a plurality of relays, if desired, but only one relay is shown for purposes of description. It is also apparent that electronic switches might be employed instead of relays. Energization of the winding of each of the relays is controlled by a relay amplifier, relays 41, 42, 43, and 44 in the $X$ input circuit being associated with relay amplifiers 45, 46, 47, and 48 respectively, and relays 141, 142, 143, and 144 in the $Y$ input circuit being associated with relay amplifiers 145, 146, 147, and 148 respectively. Each of the relay amplifiers is of the type which may be preset to become operative only when the input voltage reaches a specified value, and to conduct at a constant level whenever the input voltage exceeds the specified level. Thus, when the coils of the various relays are connected into the output circuits of the amplifiers, each relay will be energized only when the input to its associated amplifier has reached the predetermined level. Direct current amplifiers or control devices of this type are wellknown in the art and their principles of operation are well-understood. As was previously stated, the reference voltage $V_r$, which is equal to the maximum value that either $X$ or $Y$ may attain, was chosen as 100 volts. As shown by Fig. 5, the $X$ and $Y$ axes are divided into five equal parts, and, therefore, the values of $X$ corresponding to the points 1, 7, 13, 19, 25, and 31 along the $X$ axis are 0 volts, 20 volts, 40 volts, 60 volts, 80 volts, and 100 volts, respectively, and $Y$ input voltages of 0 volts, 20 volts, 40 volts, 60 volts, 80 volts, and 100 volts correspond to the points 1, 2, 3, 4, 5, and 6 along the $Y$ axis. Therefore, the relay amplifiers 45, 46, 47, and 48, which are associated with the $X$ input circuit, are preset to become operative at 20 volts, 40 volts, 60 volts and 80 volts, respectively, and the $Y$ input relay amplifiers 145, 146, 147, and 148 are preset to become operative at 20 volts, 40 volts, 60 volts, and 80 volts, respectively. Thus, the armatures of relays 41, 42, 43, and 44 associated with relay amplifiers 45, 46, 47 and 48, respectively, will be moved from the positions shown to their upper positions when the $X$ input has reached values of 20 volts, 40 volts, 60 volts and 80 volts, respectively. Similarly, the armatures of relays 145, 146, 147 and 148 in the $Y$ input circuit will be actuated and the armatures moved to their upper positions, when the $Y$ input has reached 20 volts, 40 volts, 60 volts and 80 volts, respectively. In order to indicate the input signal level at which the relays are actuated, relay amplifiers 45 and 145 are shown connected to a potential of −20 volts, amplifiers 46 and 146 connected to −40 volts, amplifiers 47 and 147 connected to −60 volts, and amplifiers 48 and 148 are shown connected to −80 volts. It is to be understood, however, that the input signal levels at which the amplifiers become operative may be determined by means other than connecting them to negative potentials, and such connections are shown for purposes of explanation only.

Figure 6:
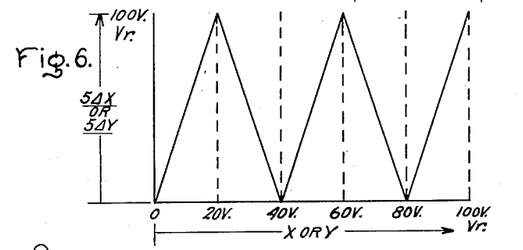
Fig. 6 is a diagram useful in understanding the method of switching involved in the apparatus.

The first operation which must be performed by the computer is to generate $\Delta X$ and $\Delta Y$ values in accordance with the values of $X$ and $Y$, as shown in Fig. 6. The values of $\Delta X$ are generated by summing amplifiers 50 and 51 operating in conjunction with relays 41, 42, 43, and 44, and $\Delta Y$ is generated by summing amplifiers 150 and 151 operating in conjunction with relays 141, 142, 143 and 144. $\Delta X$ and $\Delta Y$ are generated by identical methods, and therefore the description of the process will be made with reference to the generation of ΔX, with the understanding that a similar explanation applies to the generation of ΔY. Corresponding components of the ΔX and ΔY generating circuits are designated by numerals differing by 100. For example, amplifier 150 in the ΔY circuit corresponds to amplifier 50 in the ΔX circuit, and is identical in construction, operation and function.

Summing amplifiers 50, 51, 150, 151 and others which will be referred to hereafter, are all similar and of a well-known type. Each amplifier serves to add together the various signals connected to its input, and, in some instances will multiply these signals by various factors before summing them. Amplifiers of this type are discussed in chapter V of a book entitled "Electronic Analog Computers" by Korn and Korn (McGraw-Hill, 1952) and the circuits illustrated on pages 196 and 197 therein are quite suitable for the present application. As is well-known in the computer art, if a feedback resistor is connected across a summing amplifier from output to input, an input signal to the amplifier will in effect be multiplied by the ratio of the resistance of the feedback resistor to the resistance of the input resistor through which the signal is connected into the amplifier. For example, if one signal is fed to the amplifier through a 1-megohm resistor and a second signal is fed through a 0.5-megohm resistor and the amplifier has a 5-megohm feedback resistor, the first signal will be multiplied by five and the second signal will be multiplied by ten, before they are summed, and inverted by the amplifier. This principle is utilized in the present invention.

As previously explained in general, the slopes of the lines representing the values of ΔX and ΔY reverse as X and Y pass through boundary values. In the present instance, where the spans S are all equal to 0.2, it is desirable to generate 5ΔX and 5ΔY, which are parts of the polynomials of Eq. 16, rather than only ΔX and ΔY. A plot of the values of 5ΔX and 5ΔY is shown in Fig. 6, and these signals are generated in the following manner.

The X input signal is connected from input terminal 52 to amplifier 50 through a 1-megohm input resistor 53 as well as to relay amplifiers 45, 46, 47 and 48. A 1-megohm feedback resistor 54 is connected across amplifier 50, and because resistors 53 and 54 are of the same value, amplifier 57 serves only to invert the X input signal. Thus, at the output of summing amplifier 50, the signal is equal to (−X). The value of the X input signal determines by what path it is sent to summing amplifier 51, and what other signal (if any) also is connected to the input of summing amplifier 51. If X is less than 20 volts, and the armatures of all relays will be as shown in the drawing, only the (−X) signal is connected to the input of summing amplifier 51. Specifically, the signal is connected through a 1-megohm input resistor 55, through normally closed contacts 42f of relay 42, through normally closed contacts 44f of relay 44, and thence to amplifier 51. A 5-megohm feedback resistor 56 is connected across summing amplifier 51, and, because the ratio of resistor 56 to resistor 55 is 5:1, the signal is multiplied by five and again inverted, and the output of summing amplifier 51 is equal to 5X, which, when X is less than 20 volts, is equal to 5ΔX.

As previously explained, and illustrated in Fig. 6, as the input signal X increases from 20 to 40 volts, 5ΔX must decrease from 100 to 0 volts. When the X input signal reaches and passes 20 volts, relay 41 is actuated, which opens contacts 41d, 41e, and 41f, and closes contacts 41a, 41b, and 41c. Thus, the (−X) output signal of amplifier 50 is connected to the input of amplifier 51 through input resistor 55, through contacts 42f of relay 42 (which has not yet been actuated), and through contacts 44f of relay 44. However, because relay 41 is now closed, another signal is also connected to the input of summing amplifier 51. This signal is (X−20), which appears at the juncture of resistors 57 and 58, the remote ends of these resistors being connected to −20 volts and to the X input, respectively. The (X−20) signal passes through the now closed contacts 41a of relay 41, through contacts 42f of relay 42, and through contacts 44f of relay 44. The value of each of the resistors 57 and 58 is 0.5 megohm, and, therefore, because of the 5-megohm feedback resistor 56 across amplifier 51, the signal (X−20) is multipled by ten, to produce a signal (10X−200). The (−X) signal from amplier 50 is multiplied by five, as before, and the two products summed and inverted. Thus, the output of summing amplifier 51 is equal to (200−5X), and as the X input signal increases from 20 volts to 40 volts, the output of amplifier 51 decreases from 100 volts to zero volts, and again represents the term 5ΔX, which decreases in the manner shown in Fig. 6.

When the X input signal reaches and exceeds 40 volts, relay 42 is actuated and the contacts 42d, 42e, 42f are opened, while contacts 42a, 42b, and 42c are closed. Thus, the (−X) signal and the (X−20) signal are no longer connected through contacts 42f of relay 42 to the input of amplifier 51. At this time, the input signal to amplifier 51 is taken from the juncture of resistors 60 and 61, whose remote ends are connected to the (−X) output of amplifier 50 to +40 volts, respectively. Thus, the signal appearing at the juncture of these resistors is equal to (40−X). This signal is connected to the input of amplifier 51 through contacts 42c of relay 42, and through contacts 44f of relay 44. The resistors 60 and 61 each have a value of 1 megohm, and, therefore, when this signal is acted on by summing amplifier 51, with its 5-megohm feedback resistor 56, the signal is multiplied by five and inverted. The output signal of amplifier 51 thus becomes (5X−200), which is equal to 5ΔX as X increases from 40 to 60 volts.

When the value of X lies between 60 volts and 80 volts, a slightly more complicated condition exists in the ΔX generator than previously described. In this case, the signal (40−X) is still connected to the input of amplifier 51, because contacts 42c of relay 42 and contacts 44f of relay 44 remain closed. In addition, however, another signal, which appears at the juncture of resistors 62 and 63 is also connected to the input of amplifier 51. The remote ends of resistors 62 and 63 are connected to the X input and to −60 volts, respectively, and the signal appearing at their juncture is (X−60). This signal passes through contacts 43a of relay 43, which is actuated when the X input signal is equal to or greater than 60 volts, and then passes through contacts 44f of relay 44 and thence to the input of amplifier 51. The resistors 62 and 63 each have a value of 0.5 megohm, and thus the signal (X−60) is multiplied by ten by the amplifier 51. The signal (40−X) which also is fed to the amplifier, is multiplied by five and the two terms are added and inverted by the amplifier. Thus the output of the amplifier is equal to (400−5X), and it is apparent that as X increases from 60 volts to 80 volts, the output of amplifier 51 will be equal to 5ΔX, which decreases from 100 volts to zero volts as X increases.

When the X input signal reaches a value of 80 volts, the relay 44 closes, which removes all of the signals thus far discussed from the input to amplifier 51. In this instance, the signal which is connected to the amplifier 51 is that which appears at the juncture of 1-megohm resistors 64 and 65, whose outer ends are connected to +80 volts and the (−X) signal, respectively. This signal, which is (80−X), is connected through contacts 44c of relay 44 to amplifier 51, where it is multiplied by five and inverted. Thus, the output of amplifier 51, when the X input lies between 80 volts and 100 volts, is (5X−400), which is equal to 5ΔX, and the value of 5ΔX increases from zero to 100 volts as X increases from 80 volts to 100 volts.

Inspection of Eq. 16 reveals that the only term involving $\Delta X$ and $\Delta Y$, which has not yet been generated, is $$\left(\frac{\Delta X \Delta Y}{4}\right)$$

In order to generate this term, the output $5\Delta X$ of amplifier 51 and the output $5\Delta Y$ of amplifier 151 are fed to a multiplier 66. The multiplier 66 may be of any conventional well-known type which will multiply the values of $5\Delta X$ and $5\Delta Y$ and divide the resultant product by 100. Amplifiers of this type are discussed and explained in chapter VI of the book "Electronic Analog Computers," previously referred to, and a specific multiplier, which is quite suitable for the present application, is discussed on pages 228 and 229 thereof, under the heading "Time Sharing Schemes." Another amplifier which is suitable for this purpose is described in an article by C. D. Morrill and R. V. Baum entitled "Stabilized Time Division Multiplier," which appeared in Electronics, volume 25, No. 12 (December 1952), page 139, et seq.

It is now necessary to combine the three signals $$5\Delta X, 5\Delta Y, \text{ and } \left(\frac{\Delta X \Delta Y}{4}\right)$$

thus far generated in accordance with the terms of Eq. 16, before multiplying them by the resistance ratios $$\frac{R_1}{R}, \frac{R_2}{R}, \frac{R_3}{R}, \frac{R_4}{R}$$

This combination is effected by summing amplifiers 67, 68, 70 and 71. The output of multiplier 66, which is equal to $$\left(\frac{\Delta X \Delta Y}{4}\right)$$

is connected through a 1-megohm input resistor 72 to summing amplifier 67. Amplifier 67 is provided with a 1-megohm feedback resistor 73, and so the amplifier merely inverts the input signal to produce $$\left(\frac{-\Delta X \Delta Y}{4}\right)$$

This signal is connected through a 1-megohm input resistor 74 to summing amplifier 68, along with the signal $5\Delta X$, which is connected to the input through a 1-megohm resistor 75. The amplifier 68 is provided with a 1-megohm feedback resistor 76, and so the amplifier only adds together and inverts the two terms. Thus, the output of amplifier 68 is $$\left(-5\Delta X + \frac{\Delta X \Delta Y}{4}\right)$$

The $$\left(\frac{-\Delta X \Delta Y}{4}\right)$$

output of amplifier 67 is also connected through a 1-megohm resistor 77 to summing amplifier 70, along with the signal $5\Delta Y$, which is connected thereto through a 1-megohm resistor 78. The amplifier 70 has a 1-megohm feedback resistor 80 thereacross, and so the amplifier only adds and inverts these functions to produce an output signal $$\left(-5\Delta Y + \frac{\Delta X \Delta Y}{4}\right)$$

As is seen from Eq. 16, the polynomial which is multiplied by the ratio $$\frac{R_1}{R}$$

is $$\left(100 - 5\Delta X - 5\Delta Y + \frac{\Delta X \Delta Y}{4}\right)$$

and this signal is produced by summing amplifier 71. For this purpose, amplifier 71 has connected to its input the 100-volt reference voltage $V_r$, connected thereto from a power source not shown through an input resistor 81; the signal $$\left(-5\Delta Y + \frac{\Delta X \Delta Y}{4}\right)$$

from summing amplifier 70 connected through an input resistor 82; the signal $$\left(-5\Delta X + \frac{\Delta X \Delta Y}{4}\right)$$

from summing amplifier 68, connected through an input resistor 83; and the signal $$\left(-\frac{\Delta X \Delta Y}{4}\right)$$

from summing amplifier 67, connected through an input resistor 84. The amplifier 71 has a feedback resistor 85 connected thereacross, and the input resistors 81, 82, 83 and 84, and the feedback resistor 85 are all of 1-megohm value. Thus, amplifier 71 does not multiply any of the signals, but only adds and inverts them to provide an output signal equal to $$\left(-100 + 5\Delta X + 5\Delta Y - \frac{\Delta X \Delta Y}{4}\right)$$

which is the negative value of the term which Eq. 16 shows should be multiplied by the ratio $$\frac{R_1}{R}$$

The term associated with the resistance ratio $$\frac{R_2}{R}$$

is the inverse of the output of summing amplifier 68. Likewise, the term which is multiplied by the ratio $$\frac{R_3}{R}$$

is the inverse of the output of summing amplifier 70, and the term which is multiplied by the ratio $$\frac{R_4}{R}$$

is the inverse of the output of summing amplifier 67. All of the multiplications are made using the inverse of the terms set forth in Eq. 16, because, when the four terms are finally added together, the sum is inverted by the final summing amplifier.

The multiplication of each of the four polynomial terms of Eq. 16 by the proper resistance ratio is performed by potentiometers. That is, each of the thirty-six corner values of Z corresponding to predetermined values of X and Y, as shown in Fig. 5, is represented by a potentiometer, as previously discussed. The quantity R, which is constant is represented by the overall resistance of the potentiometer, and the quantities $R_1$, $R_2$, $R_3$, etc., are represented by the resistance of the winding of the potentiometer between the point at which the movable pickoff arm contacts the potentiometer and one end of the winding. The proper ratios of resistances to represent the thirty-six corner values of the function may be preset using static values of the X and Y variables at each of the thirty-six points. When the theory of "zero switching," which was previously developed in detail, is applied to the corner points shown in Fig. 5, it is seen that the resistance ratio $$\frac{R_1}{R}$$

must represent the value of $$\frac{Z_1}{Z_{max}}$$

corresponding to points 1, 3, 5, 13, 15, 17, 25, 27 and 29. Similarly, the ratio $$\frac{R_2}{R}$$

must represent the values of $$\frac{Z_2}{Z_{max.}}$$

corresponding to points 7, 9, 11, 19, 21, 23, 31, 33 and 35, in order to cooperate with the previously mentioned points and serve as base lines for interpolating in the Y direction in each elemental area. It is also seen that the resistance ratio $$\frac{R_3}{R}$$

must be changeable to represent $$\frac{Z_3}{Z_{max.}}$$

for points 2, 4, 6, 14, 16, 18, 26, 28, and 30, and the ratio $$\frac{R_4}{R}$$

must be interchangeable to represent $$\frac{Z_4}{Z_{max.}}$$

at the points 8, 10, 12, 20, 22, 24, 32, 34, and 36. Thus it appears that the potentiometers which represent the various values of $$\frac{Z}{Z_{max.}}$$

may conveniently be arranged in four matrices 86, 87, 88 and 89, having nine potentiometers each, arranged in horizontal and vertical groups of three, the potentiometers of matrices 86, 87, 88 and 89 defining the possible values of $$\frac{R_1}{R}, \frac{R_2}{R}, \frac{R_3}{R} \text{ and } \frac{R_4}{R}$$

respectively. In each matrix, at any one time, one horizontal group of three potentiometers is connected to the input circuit, and one vertical group of three potentiometers is connected to the output circuit. Thus, only one potentiometer in each matrix may be connected to both the input and output circuits.

Each potentiometer has a resistance of 50,000 ohms, and each movable contact arm has a 1-megohm fixed resistor in series therewith, which serves as an input resistor for a final summing amplifier. Each potentiometer is designated by a numeral which differs by 100 from the designator of the point (Fig. 5) for which it represents $$\frac{Z}{Z_{max.}}$$

For example, the potentiometer which represents the ratio $$\frac{Z_1}{Z_{max.}}$$

at point 1 (Fig. 5), is designated as potentiometer 101, and so on for all thirty-six points. The fixed resistor associated with each potentiometer bears the designating numeral of its potentiometer followed by the letter "a." It is seen that one end of each potentiometer is grounded, while the other end is connected to the input circuit through relay contacts. Therefore, the ratio of $$\frac{Z}{Z_{max.}}$$

for the various points is the ratio of the resistance of the potentiometer between the setting of the contact arm and ground to the total resistance for each potentiometer. Thus, when a signal is connected to the ungrounded end of a potentiometer the output taken from the contact arm is equal to the signal multiplied by the resistance ratio described above.

The input relays 41, 42, 43 and 44 select the horizontal group of potentiometers in each matrix to be connected to the matrix input circuit, and the Y input relays 141, 142, 143 and 144 select the vertical group of potentiometers in each matrix to be connected to the input of a final summing amplifier 91. For example, looking at matrix 86, which contains the potentiometers for multiplying $$\frac{R_1}{R}$$

by the output of summing amplifier 71, it is seen that potentiometers 101, 103 and 105 are connected to the output of summing amplifier 71 through contacts 41f of relay 41, which are closed until the X input signal reaches 20 volts, and through contacts 43f of relay 43, which are closed until X reaches 60 volts. Therefore, when the X input signal is less than 20 volts, potentiometers 101, 103 and 105 serve as possible corner values for the elemental area within which Z lies. When the X input signal is between 20 volts and 40 volts, points 13, 15 and 17 may be possible corner values for the elemental area concerned, and, therefore, the potentiometers 113, 115 and 117 must be connected to the matrix input circuit, instead of potentiometers 101, 103 and 105. When the X input signal reaches 20 volts, relay 41 closes, which opens contacts 41f and disconnects the inputs of potentiometers 101, 103 and 105 from the output of summing amplifier 71. Now, however, contacts 41c are closed, and the inputs of potentiometers 113, 115 and 117 are connected therethrough, and through closed contacts 43f of relay 43, which is not actuated until the X input signal reaches 60 volts. It is also seen from Fig. 5 that points 13, 15 and 17 remain as possible corner points for the elemental areas concerned, when the X input signal lies between 20 volts and 60 volts. Therefore, as X increases past 40 volts, the potentiometers 113, 115 and 117 are not switched out of the circuit, but remain connected as before, through contacts 41c of relay 41 and through contacts 43f of relay 43. However, when the X input signal lies between 60 volts and its maximum value of 100 volts, the corner points 13, 15 and 17 should be replaced by corner points 25, 27 and 29. Therefore, when X increases beyond 60 volts, relay 43 closes, thus opening contacts 43f, and disconnecting potentiometers 113, 115 and 117 from the output of summing amplifier 71. Contacts 43c of relay 43 are now closed, and the inputs to potentiometers 125, 127 and 129 are connected through these contacts to the output of summing amplifier 71, and this connection remains unbroken until the X signal input level drops below 60 volts.

While the value of the X input signal has determined which horizontal group of three potentiometers will be energized, the value of the Y input signal determines which vertical group of three potentiometers will have their outputs connected to the final summing amplifier. When Y lies between zero and 20 volts, the possible first corner points are points 1, 13 and 25. Therefore, the outputs of potentiometers 101, 113 and 125 are connected to the input to final summing amplifier 91, through contacts 141f of relay 141, which are closed until the Y input signal reaches 20 volts, and through contacts 143f of relay 143, which are closed until Y reaches 60 volts. When the Y input signal lies between 20 volts and 60 volts, the potentiometers 101, 113 and 125 must be replaced by potentiometers 103, 115 and 127. When relay 141 closes at a Y input signal level of 20 volts, it opens contacts 141f and closes contacts 141c, thus disconnecting potentiometers 101, 113 and 125 from the input to amplifier 91, and connecting potentiometers 103, 115 and 127 thereto.

These potentiometers remain in the circuit until the Y input signal increases to 60 volts, at which time, relay 143 closes. When relay 143 closes, it opens contacts 143f and closes contacts 143c, thus disconnecting potentiometers 103, 115 and 127 from the input to amplifier 91, and connecting potentiometers 105, 117 and 129 thereto, and these potentiometers remain so connected until the Y input signal drops below 60 volts. Thus, it is seen that, at any one time, only one potentiometer of those comprising matrix 86, is connected to both the output of summing amplifier 71 and the input of summing amplifier 91, and that the output of this potentiometer is the inverse of the first term of Eq. 16, that is $$\frac{R_1}{R}\left(-100+5\Delta X+5\Delta Y-\frac{\Delta X \Delta Y}{4}\right)$$

The potentiometers of matrix 87 serve to multiply the output of summing amplifier 68 by the ratio $$\frac{R_2}{R}$$

which corresponds to the second corner points of the elemental area involved. It was previously seen that, when the X input signal is less than 20 volts, one of the potentiometers 101, 103 and 105 is selected from matrix 86 to represent the first corner value of the function. Therefore, the second corner value must be for point 7, 9 or 11, which values are represented by potentiometers 107, 109 and 111 in matrix 87. When the X input signal is less than 40 volts, these potentiometers are connected to the output of summing amplifier 68 through closed contacts 42d of relay 42 and through closed contacts 44d of relay 44. It is apparent from Fig. 5 that these same potentiometers may serve to represent corner values when the value of X is between 20 volts and 40 volts, and they are allowed to do so, because relay 42 does not close until the X input signal reaches 40 volts, and relay 44 does not close until Y has reached 80 volts. When the X input signal reaches 40 volts, potentiometers 107, 109 and 111 must be replaced by potentiometers 119, 121 and 123. At this time, relay 42 closes, which opens contacts 42d and disconnects potentiometers 107, 109 and 111 from the output of summing amplifier 68. However, contacts 42a are now closed, and potentiometers 119, 121 and 123 are energized from the output of amplifier 68 through these contacts of relay 42 and through contacts 44d of relay 44. These potentiometers can no longer represent possible corner values of the function after the X input signal increases beyond 80 volts, and they must then be replaced by potentiometers 131, 133 and 135. This is accomplished by relay 44, which closes when the X input signal reaches 80 volts, thus opening contacts 44d and closing contacts 44a. Potentiometers 119, 121, and 123 are disconnected from amplifier 68 when contacts 44d open, and potentiometers 131, 133 and 135 are connected thereto when contacts 44a close. This connection remains until X decreases below 80 volts, when the reverse action occurs.

The vertical group of potentiometers in matrix 87, which have their outputs connected to the input of summing amplifier 91, is selected by the Y input relays. When the Y input signal is less than 20 volts, and potentiometers 101, 113 and 125 are selected from matrix 86, potentiometers 107, 119 and 131 are selected from matrix 87. The outputs of these latter three potentiometers are connected through contacts 141e of relay 141, and through contacts 143e of relay 143, to amplifier 91. When the Y input signal reaches a value of 20 volts, and potentiometers 103, 115 and 127 are selected from matrix 86, potentiometers 107, 119 and 131 in matrix 87 are replaced by potentiometers 109, 121, and 133. This action is controlled by the same relay that controls the action of matrix 86, that is, relay 141, which closes when Y increases to 20 volts. When relay 141 closes, it opens contacts 141e, thus disconnecting potentiometers 107, 119 and 131 from amplifier 91, and closes contacts 141b to connect the outputs of potentiometers 109, 121 and 133 to the amplifier. These potentiometers remain in the circuit until relay 143 closes, when the Y input signal reaches 60 volts. The closing of relay 143 replaces potentiometers 103, 115 and 127 in matrix 86 with potentiometers 105, 117 and 129, and also replaces potentiometers 109, 121 and 133 in matrix 87 with potentiometers 111, 123 and 135. Potentiometers 109, 121 and 133 are connected to amplifier 91 through contacts 143e of relay 143, and are disconnected when the relay opens. However, when contacts 143e open, contacts 143b close, and connect potentiometers 111, 123 and 135 to final summing amplifier 91. Thus, the proper potentiometer is selected from matrix 87 to cooperate with that potentiometer selected from matrix 86, and the two potentiometers so selected serve to represent the second and first corner values of the function, with their outputs being the inverse of the second and first terms of Eq. 16, respectively.

The action of relays 41 and 43 determines which horizontal group of potentiometers in matrix 88 will be energized to represent possible third corner values of the function. It is noted that relays 41 and 43 also control the selection of the first corner values through the potentiometers of matrix 86, and, therefore, the proper third corner potentiometer will be chosen to cooperate with the first corner potentiometer chosen. For example, when potentiometers 101, 103 and 105 in matrix 86 have been energized, potentiometers 102, 104 and 106 in matrix 88 are energized. The latter three potentiometers are connected to the output of summing amplifier 70 through closed contacts 41e of relay 41 and through closed contacts 43e of relay 43. When the X input signal reaches 20 volts, and the potentiometers in matrix 86 corresponding to points 1, 3 and 5 are replaced by those corresponding to points 13, 15 and 17, a similar action occurs in matrix 88, where those potentiometers corresponding to points 2, 4 and 6 are replaced with those corresponding to points 14, 16 and 18. That is, when relay 41 closes at an X input signal level of 20 volts, contacts 41e open and disconnect potentiometers 102, 104 and 106 from amplifier 70, and contacts 41b close to connect potentiometers 114, 116 and 118 thereto. These potentiometers represent corner values of the function until the X input signal reaches 60 volts, at which time relay 43 operates to replace potentiometers 113, 115 and 117 in matrix 86 with potentiometers 125, 127 and 129, and to replace potentiometers 114, 116 and 118 of matrix 88 with potentiometers 126, 128 and 130. When relay 43 closes, it opens contacts 43e, through which potentiometers 114, 116 and 118 were connected to amplifier 70, and closes contacts 43b, through which potentiometers 126, 128 and 130 are energized from the output of amplifier 70. These potentiometers remain in the circuit while the X input signal is between 60 volts and 100 volts.

Figure 5:
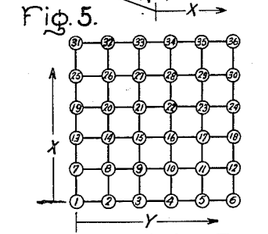

It is seen from Fig. 5 that points 2, 14 and 26 may be possible corners of elemental areas when the Y input signal is between zero and 40 volts, points 4, 16 and 28 may be corners when Y is between 40 volts and 80 volts, and points 6, 18 and 30 may be corners when Y exceeds 80 volts. Therefore, the selection of potentiometers from matrix 88 to represent the values of the function corresponding to these points, resides in relays 142 and 144, which are actuated when the Y input signal reaches 40 volts and 80 volts, respectively. When the Y input signal is less than 40 volts, the outputs of potentiometers 102, 114 and 126 are connected to the final summing amplifier 91 through closed contacts 142d of relay 142 and through closed contacts 144d of relay 144. When the Y input signal reaches 40 volts, this connection is broken, and potentiometers 104, 116 and 128 are so connected through now-closed contacts 142a of relay 142, and through closed contacts 114d of relay 144, which has not yet been actuated. These potentiometers remain in the circuit until the Y input signal reaches 80 volts, at which time relay 144 is actuated. When relay 144 closes, it opens contacts 144d, thus disconnecting the outputs of potentiometers 104, 116 and 128 from the input of final summing amplifier 91, and closes contacts 144a, thus connecting the outputs of potentiometers 106, 118 and 130 to amplifier 91. The potentiometers of matrix 88 are energized by the output of amplifier 70, which provides a signal equal to $$\left(-5\Delta Y+\frac{\Delta X\Delta Y}{4}\right)$$

This signal is multiplied by the resistance ratio of the potentiometer selected by the relays to represent $$\frac{R_3}{R}$$

and the output signal, which is connected to the input of final summing amplifier 91, is equal to the inverse of the third term of Eq. 16.

The potentiometer which represents the fourth corner value of the function in whichever elemental area it lies is selected from matrix 89. Relays 42 and 44, which select the horizontal group of potentiometers from matrix 87, also select the horizontal group from matrix 89 to correspond to that selected from matrix 87. For example, when the X input signal lies between zero and 40 volts, and potentiometers 107, 109 and 111 in matrix 87 are energized, potentiometers 108, 110 and 112 in matrix 89 are connected to the output of summing amplifier 67 through closed contacts 42e of relay 42, and through closed contacts 44e of relay 44. When the X input signal reaches 40 volts, and relay 42 is actuated, it replaces potentiometers 107, 109 and 111 in matrix 87 with potentiometers 119, 121 and 123, and simultaneously replaces potentiometers 108, 110 and 112 in matrix 89 with potentiometers 120, 122 and 124. When relay 42 closes, it opens contacts 42e, thus disconnecting potentiometers 108, 110 and 112 from amplifier 67, and closes contacts 42b, thus connecting potentiometers 120, 122 and 124 to amplifier 67 through contacts 44e of relay 44, which has not yet been actuated. When the X input signal reaches 80 volts, and relay 44 replaces 119, 121 and 123 in matrix 87 with potentiometers 131, 133 and 135, it also replaces potentiometers 120, 122 and 124 in matrix 89 with potentiometers 132, 134 and 136. This occurs because contacts 44e open and disconnect potentiometers 120, 122 and 124 from the output to amplifier 67, and contacts 44b close, which connects potentiometers 132, 134 and 136 to amplifier 67. This group of potentiometers remains in the circuit until the X input signal falls below 80 volts.

Relays 142 and 144, which control the selection of the vertical group of potentiometers in matrix 88 also control the selection of the vertical group in matrix 89. These relays are actuated when the Y input signal reaches 40 volts and 80 volts, respectively, and simultaneously switch potentiometers from both matrix 88 and matrix 89. For example, when the Y input signal is less than 40 volts, the outputs of potentiometers 102, 114 and 126 in matrix 88 are connected to the input of final summing amplifier 91 through the contacts of relays 142 and 144, and the outputs of potentiometers 108, 120 and 132 are similarly connected through contacts 142e of relay 142 and through contacts 144e of relay 144. When the Y input signal rises above 40 volts, potentiometers 102, 114 and 126 in matrix 88 are replaced by potentiometers 104, 116 and 128, and potentiometers 108, 120 and 132 in matrix 89 are replaced by potentiometers 110, 122 and 134. When relay 142 is actuated, it opens contacts 142e and disconnects the outputs of potentiometers 108, 120 and 132 from final summing amplifier 91, and closes contacts 142b, thus connecting the outputs of potentiometers 110, 122 and 134 to amplifier 91 through contacts 144e of relay 144, which has not yet been actuated. Similarly, when the Y input signal reaches 80 volts, and potentiometers 104, 116 and 128 in matrix 88 are replaced with potentiometers 106, 118, and 130, potentiometers 110, 122 and 134 in matrix 89 are replaced with potentiometers 112, 124 and 136. This action takes place because, when relay 144 is actuated, contacts 144e open, thus disconnecting the outputs of potentiometers 110, 122 and 134 from amplifier 91, and contacts 144b close, thus connecting the outputs of potentiometers 112, 124 and 136 to the input of final summing amplifier 91. Thus, the signal which is connected to the input of the final summing amplifier 91 from matrix 89 is the output signal of amplifier 67, which is equal to $$\frac{-\Delta X\Delta Y}{4}$$

multiplied by the resistance ratio of the potentiometer selected by the relays to represent $$\frac{R_4}{R}$$

and this signal equal to the inverse of the fourth term of Eq. 16.

The final summing amplifier 91 is provided with a 1-megohm feedback resistor 92, which is seen to be of the same value as the resistors connected in series with the output of the thirty-six matrix potentiometers. Therefore, the various signals connected to the amplifier 91 from the matrices are not multiplied, but are merely added together and inverted. It is because of the inversion performed by the final summing amplifier 91 that the four signals connected to its input from the matrices have polarities opposite to those shown in Eq. 16. Thus, when the signals are inverted by the amplifier, the potential appearing at output terminal 93 is proportional to the value of the function for the various values of X and Y, and is of the proper polarity.

In order to better understand the operation of the circuit, let use consider its operation for several specific values of X and Y. First, let it be assumed that the values of X and Y input lie within the area defined by the points 1, 2, 7, and 8 of Fig. 5, such, for example, as when X equals 10 volts and Y equals 10 volts. In this case, all of the relays will be unenergized, and their armatures will be in the positions shown in the drawing. First, X is inverted by the amplifier 50 and connected through resistor 55, closed contacts 42f of relay 42, and closed contacts 44f of relay 44 to the input of amplifier 51. There, the signal is multiplied by five and again inverted, and the output of amplifier 51 is equal to $5\Delta X$. No other signals are combined with the $-X$ signal at the input to amplifier 51 because the signal appearing at the juncture of resistors 57 and 58 is connected to open contacts 41a of relay 41, the signal appearing at the junctures of resistors 60 and 61 is led to open contacts 42c of relay 42, the signal appearing at the juncture of resistor 62 and 63 is led to open contacts 43a of relay 43, and the signal appearing at the juncture of resistor 64 and 65 is connected to open contacts 44c of relay 44.

A similar action occurs in the section of the device which generates the $\Delta Y$ value where the Y input signal is inverted by the amplifier 150 and connected through resistor 155, closed contact 142f of relay 142, and closed contact 144f of relay 144 to the input of summing amplifier 151. Summing amplifier 151 again inverts the signal and multiplies it by five to produce at its output a signal equal to $5\Delta Y$.

The $5\Delta X$ and $5\Delta Y$ signals are connected to the inputs of multiplier 66, the output of which is $$\left(\frac{\Delta X\Delta Y}{4}\right)$$

Summing amplifiers 67, 68, 70 and 71 then combine the values of $$5\Delta X, 5\Delta Y, \text{ and } \frac{\Delta X\Delta Y}{4}$$

to produce the negative values of the polynomial terms shown in Eq. 16. That term which is multiplied by the ratio $$\frac{R_1}{R}$$

which is present at the output of summing amplifier 71, is connected to the input of potentiometers 101, 103 and 105 of matrix 86, the connection being made through closed contacts 43f of relay 43 and closed contacts 41f of relay 41. The output of potentiometer 101 is selected by the Y input relays as the proper one to represent $$\frac{R_1}{R}$$

and the output of this potentiometer is connected to final summing amplifier 91 through closed contact 141f of relay 141, and through closed contact 143f of relay 143. The output of summing amplifier 68, which is the signal by which $$\frac{R_2}{R}$$

must be multiplied, is connected to the input of potentiometers 107, 109 and 111 through closed contact 44d of relay 44, and closed contact 42d of relay 42, and the potentiometer of this group which corresponds to corner point 7 is selected by the relays in the Y input section. Thus, it is seen that the output of potentiometer 107 is connected to the input of summing amplifier 91 through closed contact 141e of relay 141, and closed contact 143e of relay 143.

Thus far, it is seen that the relays have selected potentiometers 101 and 107, corresponding to points 1 and 7 shown in Fig. 5 to represent two of the corner values of the elemental area within which the value of the function lies. The third polynomial shown in Eq. 16, which is the term $$\left(5\Delta Y - \frac{\Delta X \Delta Y}{4}\right)$$

is equal to the negative output of summing amplifier 70, and this signal must be connected to the input of the proper potentiometer in matrix 88. When the X input is less than 20 volts, the output of summing amplifier 70 is connected to the inputs of potentiometers 102, 104 and 106 in matrix 88 through closed contacts 43e of relay 43, and through closed contacts 41e of relay 41. The proper one of these three potentiometers to represent the corner value of the area is selected by the relays in the Y input circuit. The only potentiometer of these three, which has its output connected to the input of final summing amplifier 91 is potentiometer 102 which is so connected through closed contacts 142d of relay 142, and through closed contacts 144d of 144.

Similarly, the potentiometer corresponding to the value of the function at the fourth corner of the elemental area is energized by the output of summing amplifier 67, which is connected through closed contacts 44e of relay 44 and closed contacts 42e of relay 42 to the inputs of potentiometers 108, 110, and 112 of the matrix 89. The output of the proper one of these potentiometers is connected through the contacts of the relays in the Y input section to the input of final summing amplifier 91. It is seen that the only potentiometer of the three which is so connected is potentiometer 108 which is connected through closed contacts 142e of relay 142 and through closed contact 144e of relay 144. Thus it is seen that the relays in the X and Y input circuits have selected the potentiometers 101, 102, 107, and 108, which are the proper ones to correspond to the corner points of the area within which X and Y lie, as seen in Fig. 5, and the polynomial terms involving $$5\Delta X, \ 5\Delta Y \quad \text{and} \quad \frac{\Delta X \Delta Y}{4}$$

have all been multiplied by the proper resistance ratios $$\frac{R_1}{R}, \frac{R_2}{R}, \frac{R_3}{R}, \quad \text{and} \quad \frac{R_4}{R}$$

as shown in Eq. 16. Final summing amplifier 91 then adds and inverts these four terms and the signal appearing at output terminal 93 is the value of $$\frac{ZV_r}{Z_{max}}.$$

produced by linear interpolation between the corner values of the function for the rectangular elemental area within which it lies.

Let us now assume that the values of X and Y input signals are each equal to 30 volts, which means that they will lie within the area defined by points 8, 9, 14, and 15 as shown in Fig. 5. In accordance with the principle of "zero switching," which was previously discussed in detail, not all of the potentiometers representing the corner values of Z need be changed, as it is apparent that that potentiometer representing corner point 8 is common to the two elemental areas involved when X and Y equal 10 volts and when X and Y equal 30 volts.

In the X input section, when the input signal passes 20 volts, relay 41 closes, thus opening its lower set of contacts and closing its upper set. The X input signal is inverted by the amplifier 50, and is connected through resistor 55, through closed contact 42f of relay 42, and through closed contact 44f of relay 44 to the input of amplifier 51. However, because relay 41 has now closed, the signal appearing at the juncture of resistors 57 and 58, which is equal to $(X-20)$, will also be connected to the input of amplifier 51 through closed contacts 41a of relay 41, contacts 42f of relay 42, and contacts 44f of relay 44. Amplifier 51 inverts the $(-X)$ signal and multiplies it by five because of the 5:1 ratio of the feedback resistor 56 to the input resistor 55, to provide the term $(5X)$. The amplifier 51 also multiplies and inverts the term $(X-20)$, the multiplication in this case being ten times, because of the ratio of the 5-megohm feedback resistor 61 to the 0.5-megohm input resistors 57 and 58, and sums the two terms. Thus, the output of amplifier 51 is equal to $(200-5X)$, which produces the proper value of $5\Delta X$, when X equals 30 volts, as seen in Fig. 6. A corresponding action is taking place in the Y input section, and the output of the amplifier 151 is equal to $5\Delta Y$, which in this case is equal to $(200-5Y)$. The $5\Delta X$ and $5\Delta Y$ signals are multiplied by multiplier 66, and the negative values of the various polynomial terms required by Eq. 16 are formed by amplifiers 67, 68, 70 and 71, in the manner discussed above.

It is seen from Fig. 5, that the proper elemental area within which to perform the necessary interpolation when X and Y each equal 30 volts, is that defined by corner points 8, 9, 14, and 15. Therefore, potentiometers 108, 109, 114 and 115 must be selected from their matrices. It is seen that potentiometer 115 lies within matrix 86, and it is energized by the output of summing amplifier 71, connected thereto through closed contacts 41c of relay 41, and closed contact 43f of relay 43. Potentiometers 113 and 117, of course, are also energized by this same means, but the output of potentiometer 115 alone is selected by the relays in the Y input section, and is connected to the input of final amplifier 91 through contacts 141c of relay 141, and through contacts 143f of relay 143. The potentiometers of matrix 87 are energized by the output of summing amplifier 68, and the output is selected from potentiometer 109 in this matrix. Potentiometers 107, 109 and 111 are connected to the output of summing amplifier 68 through closed contact 42d of relay 42 and closed contact 44d of relay 44. Of these three, only the output of potentiometer 109 is connected to the input of final amplifier 91, the connection being through closed contact 141b of relay 141, and through closed contact 143e of relay 143, both of these relays being in the Y input circuit. The output of summing amplifier 70 must be connected to one of the potentiometers of matrix 88. It is seen that this connection is through closed contacts 43e of relay 43 and through closed contacts 41b of relay 41 to energize potentiometers 114, 116, and 118. The output of potentiometer 114 is connected to the final summing amplifier 91 through closed contacts 142d of relay 142 and through closed contacts 144d of relay 144. It is noted that potentiometer 108, which corresponds to corner point 8 of Fig. 5 is common to the elemental areas involved when X and Y are 10 volts and when X and Y are 30 volts. The input to this potentiometer is through relays 42 and 44, which are in the same condition when X equals 30 volts as when X equals 10 volts, and the output from potentiometer 108 is connected to final amplifier 91 through Y input relays 142 and 144, which are also in the same condition as when Y equals 10 volts. Thus, only three switching operations are involved, and it may be seen that when the X input reached 20 volts, and the relay 41 closed, the potentials on each contact of the pairs associated with switching the various potentiometers was zero. Therefore, no transients were generated by the switching action, and if X and Y vary smoothly, the output value of $$\frac{ZV_r}{Z_{max.}}$$

will likewise vary smoothly.

In order better to illustrate the switching principle, let it now be assumed that the value of Y remains at 30 volts, but the value of X increases from 30 volts to 50 volts. Thus, it is seen from Fig. 5 that the elemental area involved changes from that defined by corner points 8, 9, 14, and 15 to that area defined by corner points 20, 21, 14, and 15. It is also seen that potentiometers 108 and 109 must be replaced by potentiometers 120 and 121, respectively, but that potentiometers 114 and 115 will remain in the circuit and no switching will be associated with them. When the value of X passes 40 volts, as X increases from 30 to 50 volts, relay 42 will close. Relay 42 is the only relay in the X input circuit whose condition will be changed when X passes 40 volts, and all relays in the Y input circuit will remain as in the previous case, because the Y value is unchanged. It was previously seen that when X equalled 30 volts potentiometer 108 was connected to the output of summing amplifier 67 through closed contacts 42e of relay 42, and potentiometer 109 was connected to the output of summing amplifier 68 through closed contacts 42d of relay 42. Now, when X passes 40 volts and relay 42 closes, these two sets of contacts open, thus disconnecting potentiometer 109 from summing amplifier 68 and potentiometer 108 from summing amplifier 67. However, when relay 42 closes and disconnects potentiometer 109 from amplifier 68, it connects the output of this amplifier through contacts 42a, which are now closed, to the inputs of potentiometers 119, 121, and 123. Since the outputs of potentiometers 109, 121, and 133 were connected through contacts 141b of relay 141 in the Y input circuit, whose condition remains unchanged, the output of potentiometer 121 is selected from matrix 87 and connected to the input of final summing amplifier 91. Similarly, although the input of potentiometer 108 is disconnected from amplifier 67 by the opening of contacts 42a of relay 42, potentiometer 120 is connected to the output of summing amplifier 67 through now closed contacts 42b of relay 42. Because the outputs of potentiometers 108, 120, and 132 are connected to the final summing amplifier through closed contacts 142e of relay 142 in the Y input circuit, whose condition remains unchanged, the output of potentiometer 120 is now so connected. Relay 42 was the only one affected by changing the value of X from 30 to 50 volts, and, therefore, only the potentiometers of matrices 87 and 89 were affected by the closing of relay 42, the other two corner values remain unaffected.

If it is now assumed that the value of Y increases from 30 volts to 50 volts, while the value of X remains at 50 volts, the condition of only one relay will be affected. That is, relay 142 will close, and when this occurs, potentiometer 116 will replace potentiometer 114 in the circuit between the output of summing amplifier 70 and the input of the final amplifier 91. The closing of relay 142 will also cause potentiometer 120 to be replaced by potentiometer 122 in the circuit between the output of summing amplifier 67 and the input of final amplifier 91. It is seen, as previously pointed out, that each time one of the X or Y circuit relays is actuated, the term of Eq. 16, which is associated with the closing of that relay, is equal to zero.

Figure 4A:
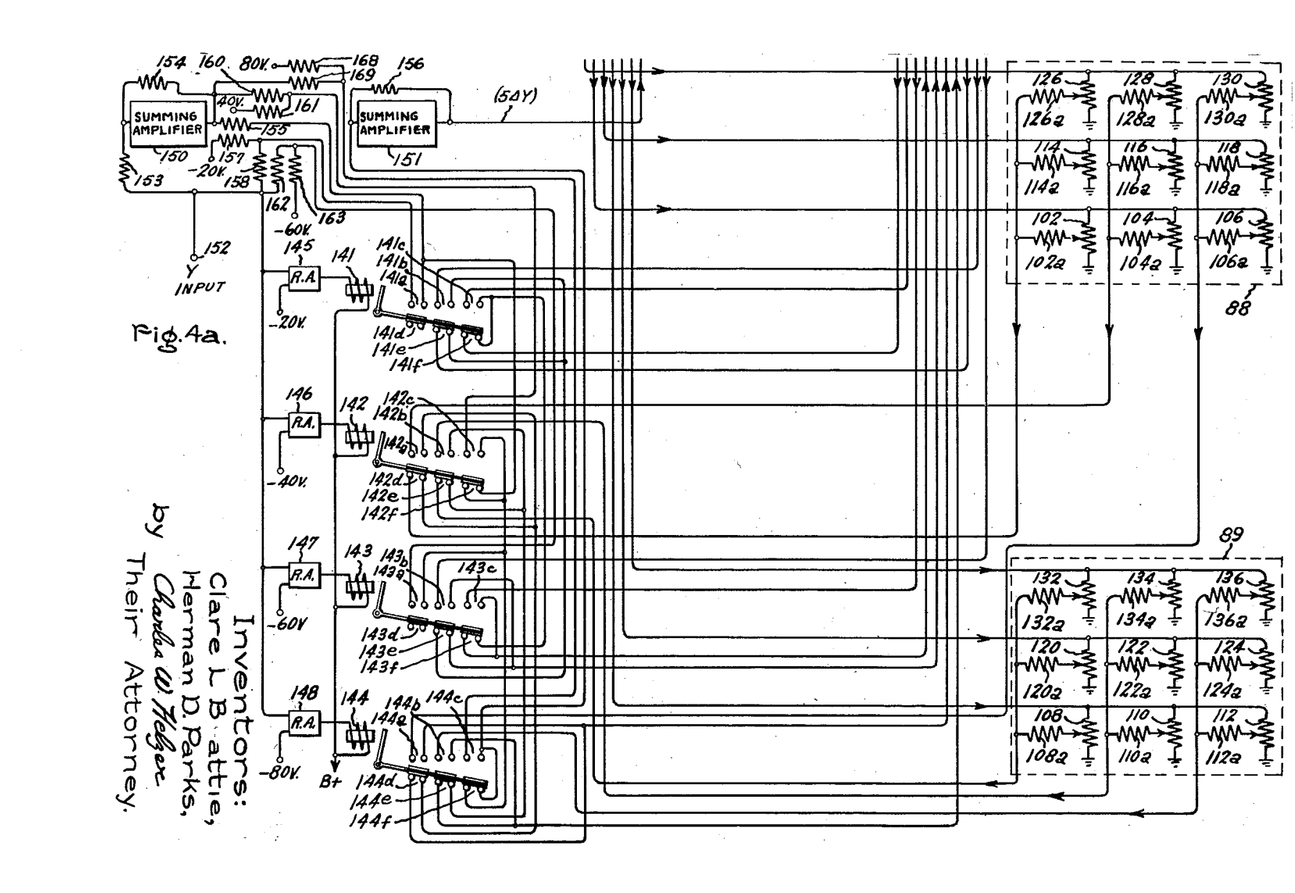
Figure 7:
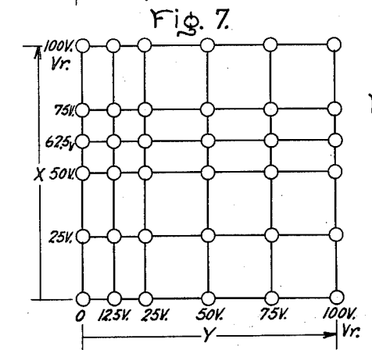
Fig. 7 is a diagram of the values of the X and Y input variables for which known values of the function are set up in the apparatus of the invention, when the values of X and Y are distributed non-linearly along their respective axes.

As was previously mentioned, the apparatus shown in the block diagram of Figs. 4 and 4a is designed for that case when the X, Y plane is divided into square elemental areas, all of which are of equal size. In order to adapt the device to operate with elemental areas which are not all of the same size, several modifications are necessary. For purposes of illustration, let it be assumed that it is desired to divide the X, Y plane into a plurality of elemental areas, as shown in Fig. 7, where the various elemental areas are of different sizes and shapes. The first necessary modification of the circuits shown in Figs. 4 and 4a is to set the various relay amplifiers to close their associated relays at the proper voltage levels. Thus, amplifiers 45, 46, 47 and 48 in the X input circuit would be adjusted to actuate their associated relays when the X input signal reaches 25 volts, 50 volts, 62.5 volts and 75 volts, respectively. Similarly, the relay amplifiers 145, 146, 147 and 148 in the Y input circuit would be set to close their associated relays at 12.5 volts, 25 volts, 50 volts, and 75 volts, respectively.

Figure 8:
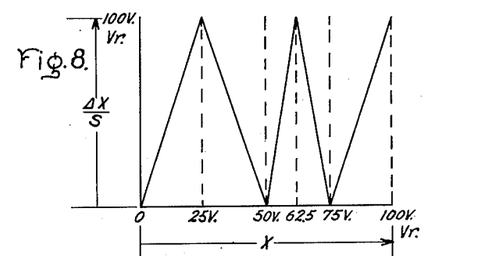
Fig. 8 is a diagram useful in understanding the switching operation in the apparatus of the invention when set up as shown in Fig. 6.
Figure 9:
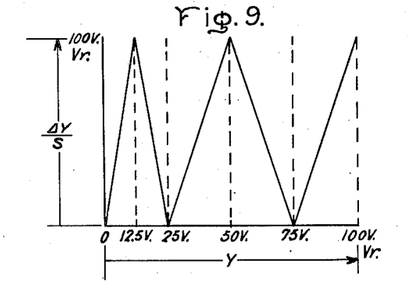
Fig. 9 is a diagram similar to Fig. 8.

As seen from Eq. 15, when the spans of the various elemental areas vary from area to area, the amplifiers 51 and 151 in the X and Y input circuits, which generate $$\frac{\Delta X}{S_{1-2}} \quad \text{and} \quad \frac{\Delta Y}{S_{1-3}}$$

respectively, must multiply $\Delta X$ and $\Delta Y$ by various constants to provide for the various spans. Thus, in the present instance, the values of $$\frac{\Delta X}{S} \quad \text{and} \quad \frac{\Delta Y}{S}$$

must be as shown in Figs. 8 and 9, respectively. For example, referring to Fig. 7, in the elemental area adjacent the zero point in both X and Y axes, the output of amplifier 51 must be equal to $4\Delta X$, while the output of amplifier 151 in the Y input circuit must be equal to $8\Delta Y$. As a further example, in that elemental area in which X equals 50–62.5 volts and Y equals 25–50 volts, the output of amplifier 51 must be $8\Delta X$, and the output of amplifier 151 must be $4\Delta Y$. These various multiplication factors may be provided either by replacing amplifier 51 by a plurality of amplifiers, having various gains, which may be switched in and out as the values of X and Y pass from one elemental area to the other, or by providing a plurality of feedback resistors similar to resistors 56 and 156, which may be switched in and out as the values of X and Y pass from one area to another. The switching may be done through additional contacts on the input relays, or by providing additional relays having their coils connected in series with the proper relay coils of the illustrated relays. It is, of course, apparent that the voltages to which the outer ends of resistors 57, 61, 63, and 64, in the X input circuit, and the corresponding resistors in the Y input circuit, are connected must correspond to those voltage values to which the various relay amplifiers are adjusted. These various changes in the circuit are felt to be obvious, and easily made by one skilled in the art. In addition, it is necessary to know or compute the values of $$\frac{Z}{Z_{\max}}$$

which correspond to the various corner values of the elemental areas. These values are then set on the corresponding potentiometers for values of X and Y corresponding to the various corner values of the elemental areas into which the X, Y plane is divided. The operation of the device, when the elemental areas are as shown in Fig. 7, is similar to that previously described with reference to Figs. 4 and 4a, and the "zero switching principle" is still incorporated in the apparatus.

If desired the reference voltage $V_r$ may be made equal to $Z_{\max}$ in which case the output of the device will be the actual value of Z, rather than the proportion. However, when this condition exists, the input variables X and Y must be scaled in accordance with Eq. 16.

It is apparent that we have provided a device which will interpolate between known values of a function of two variables when the two variables are changing at a high rate of speed. Furthermore, the apparatus is particularly well adapted to provide high accuracy in the interpolating process in any area or areas in which the function is changing rapidly. That is, the elemental areas into which the X, Y plane is divided may be made as small as necessary in those regions of rapid change of the function, so that a linear interpolation within the elemental area may be exceedingly accurate. Additionally, the device employs component parts and circuits which are well-known in the art and readily available.

It is to be understood that many changes and modifications may be made by one skilled in the art without departing from the spirit of the invention, and it is intended to be limited only by the scope of the appended claims.

What we claim as new and desire to secure by Letters Patent of the United States is:

1. A generator of a function of two variable potentials comprising means for establishing a plurality of known values of said function corresponding to predetermined values of said variable potentials, means connected to receive said variable potentials for selecting from said known values of said function four known values corresponding to the predetermined values of the variable potentials lying on each side of and adjacent to the instantaneous values of the variable potentials, and electronic means connected to receive said variable potentials and associated with said value selecting means for linearly interpolating between said four known values of said function to obtain instantaneous unknown values of said function.

2. A generator of a function of variable potentials X and Y comprising electronic means for establishing a plurality of known values of said function corresponding to predetermined values of X and Y; means connected to said value establishing means and to said X and Y potentials for selecting from said known values of said function those four known values corresponding to the predetermined values of X and Y lying on each side of and adjacent to the instantaneous values of X and Y; switching means associated with said value selecting means and connected to receive said X and Y potentials for replacing, as the instantaneous values of X and Y vary, only those values of said four selected values which do not correspond to predetermined values of X and Y lying on each side of and adjacent to the instantaneous values of X and Y with other predetermined values of the function which do so correspond; and electronic means associated with said value selecting means and responsive to said instantaneous X and Y potentials for continuously interpolating between said four known values of the function to obtain instantaneous values of the function.

3. A generator of a function Z of two variables X and Y comprising a plurality of potentiometers having movable contact pickoff arms, each potentiometer being arranged as a voltage divider and representing a known value of $$\frac{Z}{Z_{\max}}$$

corresponding to predetermined values of said variables; means for producing an electric potential $P_1$ representing $$\left[V_r - \frac{\Delta X V_r}{X_2 - X_1} - \frac{\Delta Y V_r}{Y_2 - Y_1} + \frac{\Delta X \Delta Y V_r}{(X_2 - X_1)(Y_2 - Y_1)}\right]$$

where $V_r$ is a reference potential, $X_1$ and $X_2$ are the predetermined values of X between which the instantaneous value of X lies, $Y_1$ and $Y_2$ are the predetermined values of Y between which the instantaneous value of Y lies, $\Delta X$ is the difference between the instantaneous value of X and the value of $X_1$, and $\Delta Y$ is the difference between the instantaneous value of Y and the value of $Y_1$; means for producing an electric potential $P_2$ representing $$\left[\frac{\Delta X V_r}{X_2 - X_1} - \frac{\Delta X \Delta Y V_r}{(X_2 - X_1)(Y_2 - Y_1)}\right]$$

means for producing an electric potential $P_3$ representing $$\left[\frac{\Delta Y V_r}{Y_2 - Y_1} - \frac{\Delta X \Delta Y V_r}{(X_2 - X_1)(Y_2 - Y_1)}\right]$$

means for producing an electric potential $P_4$ representing $$\left(\frac{\Delta X \Delta Y V_r}{(X_2 - X_1)(Y_2 - Y_1)}\right)$$

means associated with said plurality of potentiometers for selecting therefrom four potentiometers representing values of $$\frac{Z_1}{Z_{\max}}, \frac{Z_2}{Z_{\max}}, \frac{Z_3}{Z_{\max}} \text{ and } \frac{Z_4}{Z_{\max}}$$

$Z_1$ being the value of the function when X equals $X_1$ and Y equals $Y_1$, $Z_2$ when X equals $X_2$ and Y equals $Y_1$, $Z_3$ when X equals $X_1$ and Y equals $Y_2$, and $Z_4$ when X equals $X_2$ and X equals $Y_2$; means connecting said potential $P_1$ to energize said potentiometer representing $$\frac{Z_1}{Z_{\max}}$$

to produce at the potentiometer pickoff contact arm a potential $P_5$ representing $$\frac{Z_1 P_1}{Z_{\max}}$$

means connecting said potential $P_2$ to energize said potentiometer representing $$\frac{Z_2}{Z_{\max}}$$

to produce at the potentiometer pickoff contact arm a potential $P_6$ representing $$\frac{Z_2 P_2}{Z_{\max}}$$

means connecting said potential $P_3$ to energize said potentiometer representing $$\frac{Z_3}{Z_{\max}}$$

to produce at the potentiometer pickoff contact arm a potential $P_7$ representing $$\frac{Z_3 P_3}{Z_{\max}}$$

means connecting said potential $P_4$ to energize said potentiometer representing $$\frac{Z_4}{Z_{\max}}$$

to produce at the potentiometer pickoff contact arm a potential $P_8$ representing $$\frac{Z_4 P_4}{Z_{max_4}}$$

and means connected to said potentiometer pickoff arms for algebraically adding $P_5$, $P_6$, $P_7$ and $P_8$ to produce a potential proportional to the instantaneous value of Z.

4. The generator defined in claim 3, wherein said potentiometers are arranged in four square matrices, those in the first matrix representing known values of $$\frac{Z_1}{Z_{max.}}$$

those in the second matrix representing known values of $$\frac{Z_2}{Z_{max.}}$$

those in the third matrix representing known values of $$\frac{Z_3}{Z_{max.}}$$

and those in the fourth matrix representing known values of $$\frac{Z_4}{Z_{max.}}$$

5. A generator of a function Z of two variables which are represented by electrical potentials X and Y, said generator comprising means connected to receive said X and Y potentials for representing said X and Y potentials by $\Delta X$ and $\Delta Y$ potentials, respectively, said $\Delta X$ potential representing the difference between said X potential and a predetermined value of X, and said $\Delta Y$ potential representing the difference between said Y potential and a predetermined value of Y; means for establishing four values of Z, said values being $Z_1$, which is the value of Z when $\Delta X$ and $\Delta Y$ are both zero, $Z_2$ when $\Delta X$ is at its maximum possible value $\Delta X_{max.}$ and $\Delta Y$ equals zero, $Z_3$ when Y is at its maximum possible value $\Delta Y_{max.}$ and $\Delta X$ equals zero, and $Z_4$ when $\Delta Y$ and $\Delta X$ are both at their maximum possible values $\Delta Y_{max.}$ and $\Delta X_{max.}$; means for providing a reference potential $V_r$; means connected to receive said $\Delta X$ potential for producing a potential $P_1$ representing $$\left(\frac{\Delta X V_r}{X_{max.}}\right)$$

means connected to receive said $\Delta Y$ potential for producing a potential $P_2$ representing $$\left(\frac{\Delta Y V_r}{Y_{max.}}\right)$$

means connected to receive said $P_1$ and $P_2$ potentials for producing a potential $P_3$ representing $$\left(\frac{P_1 P_2}{V_r}\right)$$

means for connection to said reference potential $V_r$ and connected to said potentials $P_1$, $P_2$ and $P_3$ for algebraically adding $(V_r - P_1 - P_2 + P_3)$ to obtain a potential $P_4$; means connected to receive said potentials $P_1$ and $P_3$ for algebraically adding $(P_1 - P_3)$ to obtain a potential $P_5$; means connected to receive said potentials $P_2$ and $P_3$ for algebraically adding $(P_2 - P_3)$ to obtain a potential $P_6$; means connected to said value establishing means and to said potentials $P_4$, $P_5$, $P_6$, and $P_3$ for multiplying $$\frac{Z_1}{Z_{max.}} \text{ by } P_4$$

$$\frac{Z_2}{Z_{max.}} \text{ by } P_5, \frac{Z_3}{Z_{max.}} \text{ by } P_6, \text{ and } \frac{Z_4}{Z_{max.}} \text{ by } P_3$$

where $Z_{max.}$ is the maximum value of the function may attain; and means connected to said multiplying means for algebraically adding the products of said multiplications, thereby obtaining an electrical potential proportional to the value of Z.

6. A generator of a function Z of variables X and Y comprising means for providing a reference potential $V_r$; means for producing an electric potential $P_1$ representing $$\frac{\Delta X V_r}{\Delta X_{max.}}$$

where $\Delta X$ is the difference between the instantaneous value of X and a predetermined value of X, $\Delta X_{max.}$ is the maximum value $\Delta X$ can attain, and $V_r$ is a reference potential; means for producing an electric potential $P_2$ representing $$\frac{\Delta Y V_r}{\Delta Y_{max.}}$$

where $\Delta Y$ is the difference between the instantaneous value of Y and a predetermined value of Y, and $\Delta Y_{max.}$ is the maximum value $\Delta Y$ can attain; means for establishing four known values of Z, said values being $Z_1$ which is the value of Z when $\Delta X$ and $\Delta Y$ are zero, $Z_2$ when $\Delta X$ equals $\Delta X_{max.}$ and $\Delta Y$ is zero, $Z_3$ when $\Delta X$ is zero and $\Delta Y$ equals $\Delta Y_{max.}$, and $Z_4$ when $\Delta X$ equals $\Delta X_{max.}$ and $\Delta Y$ equals $\Delta Y_{max.}$; means connected to receive said potentials $P_1$ and $P_2$ for producing a potential $P_3$ representing $$\frac{P_1 P_2}{V_r}$$

means for connection to said reference potential $V_r$ and connected to receive said potentials $P_1$, $P_2$ and $P_3$ for algebraically adding $(V_r - P_1 - P_2 + P_3)$ to obtain a potential $P_4$; means connected to receive said potentials $P_1$ and $P_3$ for algebraically adding $(P_1 - P_3)$ to obtain a potential $P_5$; means connected to receive said potentials $P_2$ and $P_3$ for algebraically adding $(P_2 - P_3)$ to obtain a potential $P_6$; means connected to said value establishing means and to said potential $P_4$ for multiplying $P_4$ by the ratio of $Z_1$ to the maximum value $Z_{max.}$ that Z can attain; means connected to said value establishing means and said potential $P_5$ for multiplying $P_5$ by the ratio of $Z_2$ to $Z_{max.}$; means connected to said value establishing means and to said potential $P_6$ for multiplying $P_6$ by the ratio of $Z_3$ to $Z_{max.}$; means connected to said value establishing means and to said potential $P_3$ for multiplying $P_3$ by the ratio of $Z_4$ to $Z_{max.}$; and means connected to said multiplying means for algebraically adding the products of said multiplications to obtain an electrical potential representing $$\frac{Z V_r}{Z_{max.}}$$

where Z is the instantaneous value of the function.

7. The generator as defined by claim 6, wherein the ratios $$\frac{Z_1}{Z_{max.}}, \frac{Z_2}{Z_{max.}}, \frac{Z_3}{Z_{max.}} \text{ and } \frac{Z_4}{Z_{max.}}$$

are each represented by a potentiometer having a movable contact pickoff arm, each of said potentiometers acting as a voltage divider.

8. A generator of a function Z of two variables X and Y comprising means for establishing a plurality of known values of said function corresponding to predetermined values of said variable; means for providing a reference potential $V_r$; means for producing an electric potential $P_1$ representing $$\frac{\Delta X V_r}{X_2 - X_1}$$

where $X_1$ and $X_2$ are the predetermined values of X between which the instantaneous value of X lies, $\Delta X$ is the difference between the instantaneous value of X and the value of $X_1$, and $V_r$ is a reference potential; means for producing an electric potential $P_2$ representing $$\frac{\Delta Y V_r}{Y_2 - Y_1}$$

where $Y_1$ and $Y_2$ are the predetermined value of Y between which the instantaneous value of Y lies, and $\Delta Y$ is the difference between the instantaneous value of Y and the value of $Y_1$; means responsive to the values of said variables for selecting four values $Z_1$, $Z_2$, $Z_3$ and $Z_4$ of said function from said plurality of known values, $Z_1$ being the value of Z when X equals $X_1$ and Y equals $Y_1$, $Z_2$ when X equals $X_2$ and Y equals $Y_1$, $Z_3$ when X equals $X_1$ and Y equals $Y_2$, and $Z_4$ when X equals $X_2$ and Y equals $Y_2$; means connected to receive said potentials $P_1$ and $P_2$ for producing a potential $P_3$ representing $$\frac{P_1 P_2}{V_r}$$

means for connection to said reference potential $V_r$ and connected to receive said potentials $P_1$, $P_2$, and $P_3$ for algebraically adding $(V_r - P_1 - P_2 + P_3)$ to obtain a potential $P_4$; means connected to receive said potentials $P_1$ and $P_2$ for algebraically adding $(P_1 - P_3)$ to obtain a potential $P_5$, means connected to receive said potentials $P_2$ and $P_3$ for algebraically adding $(P_2 - P_3)$ to obtain a potential $P_6$; means associated with said value selecting means and connected to receive said potential $P_4$ for multiplying $P_4$ by the ratio of $Z_1$ to the maximum value $Z_{max}$ that Z can attain; means associated with said value selecting means and connected to receive said potential $P_5$ for multiplying $P_5$ by the ratio of $Z_2$ to $Z_{max}$; means associated with said value selecting means and connected to receive said potential $P_6$ for multiplying $P_6$ by the ratio of $Z_3$ to $Z_{max}$; means associated with said value selecting means and connected to receive said potential $P_3$ for multiplying $P_3$ by the ratio of $Z_4$ to $Z_{max}$; and means connected to said multiplying means for algebraically adding the products of said multiplications to obtain an electrical potential representing $$\frac{Z V_r}{Z_{max}}$$

where Z is the instantaneous value of the function.

9. A generator of a function Z of two variables X and Y expressed in terms of electric potentials comprising means for establishing a plurality of known values of Z corresponding to predetermined values of X and Y, said plurality of known values defining a plurality of elemental areas within which the unknown values of said function lie; means responsive to the instantaneous values of said X and Y potentials and associated with said value establishing means for selecting that area within whose boundaries the instantaneous value of Z lies, switching means associated with said area selecting means and responsive to the instantaneous values of said X and Y potentials for changing said selected area as the instantaneous value of Z passes from area to area, said areas being changed by replacing only those said known values of Z remote from that area boundary across which the instantaneous value of Z passes; and means associated with said area selecting means and responsive to said instantaneous X and Y potentials for interpolating between the boundaries of said selected area to obtain the instantaneous value of Z.

10. A generator of a function Z of two variables X and Y comprising means for establishing a plurality of known values of Z corresponding to predetermined values of X and Y, said plurality of known values defining a plurality of elemental areas within which the unknown values of said function lie; means responsive to the instantaneous values of X and Y and associated with said value establishing means for selecting that area within whose boundaries the instantaneous value of Z lies; means for representing said instantaneous values of X and Y by $\Delta X$ and $\Delta Y$, respectively, said $\Delta X$ and $\Delta Y$, respectively, being the differences between the instantaneous values of X and Y and the predetermined values of X and Y that define two boundaries of the area within which the instantaneous value of Z lies; switching means associated with said area selecting means and responsive to the instantaneous values of X and Y for changing said selected area as the instantaneous value of Z passes from area to area, said area being changed by replacing those know values of Z corresponding to values of X and Y at which $\Delta X$ and $\Delta Y$, respectively, are zero; and means associated with said area selecting means for interpolating between the boundaries of said selected area to obtain the instantaneous value of Z.

11. A generator of a function Z of two variables X and Y expressed in terms of electric potentials comprising means for establishing a plurality of known values of Z corresponding to predetermined values of X and Y, said plurality of known values defining a plurality of adjoining rectangular areas within which the unknown values of said function lie; means responsive to the instantaneous values of said X and Y potentials and associated with said value establishing means for selecting that area within whose boundaries the instantaneous value of Z lies; switching means associated with said area selecting means and responsive to the instantaneous values of said X and Y potentials for changing said selected area as the instantaneous value of Z passes from area to area, said areas being changed by replacing only those said known values of Z remote from that area boundary across which the instantaneous value of Z passes; and means associated with said area selecting means and responsive to said instantaneous X and Y potentials for continuously linearly interpolating between the boundaries of said selected area to obtain the instantaneous value of Z.

12. A generator of a function Z of two variables X and Y comprising means for establishing a plurality of known values of Z corresponding to predetermined values of X and Y, said plurality of known values defining a plurality of adjoining rectangular areas within which the unknown values of said function lie; means responsive to the instantaneous values of X and Y and associated with said value establishing means for selecting that area within whose boundaries the instantaneous value of Z lies; means for representing said instantaneous values of X and Y by $\Delta X$ and $\Delta Y$, respectively, said $\Delta X$ and $\Delta Y$ being the differences between the instantaneous values of X and Y and the predetermined values of X and Y that define two boundaries of that area within which the instantaneous value of Z lies; switching means associated with said area selecting means and responsive to the instantaneous values of X and Y for changing said selected area as the instantaneous value of Z passes from area to area, said areas being changed by replacing those known values of Z corresponding to values of X and Y at which $\Delta X$ and $\Delta Y$, respectively, are zero; and means associated with said area selecting means for continuously linearly interpolating between the boundaries of said selected area to obtain the instantaneous values Z.

References Cited in the file of this patent

UNITED STATES PATENTS

| | | |
|---|---|---|
| 2,415,190 | Rajchman | Feb. 4, 1947 |
| 2,662,147 | Willentchik | Dec. 8, 1953 |